(12) United States Patent
Joynt et al.

(10) Patent No.: US 11,055,769 B2
(45) Date of Patent: Jul. 6, 2021

(54) PLATFORM FOR PURCHASE DEMAND OF ASSETS

(71) Applicant: RULISTING INC., Mississauga (CA)

(72) Inventors: Susan Elizabeth Joynt, Mississauga (CA); Mark Church, Waterloo (CA)

(73) Assignee: RULISTING INC., Mississauga (CA)

( * ) Notice: Subject to any disclaimer, the term of this patent is extended or adjusted under 35 U.S.C. 154(b) by 570 days.

(21) Appl. No.: 15/617,763

(22) Filed: Jun. 8, 2017

(65) Prior Publication Data
US 2017/0358043 A1    Dec. 14, 2017

Related U.S. Application Data

(60) Provisional application No. 62/347,676, filed on Jun. 9, 2016.

(51) Int. Cl.
*G06Q 30/00* (2012.01)
*G06Q 30/06* (2012.01)
*G06Q 50/16* (2012.01)
*G06F 3/0481* (2013.01)

(52) U.S. Cl.
CPC ......... *G06Q 30/0643* (2013.01); *G06Q 50/16* (2013.01); *G06F 3/0481* (2013.01)

(58) Field of Classification Search
None
See application file for complete search history.

(56) References Cited

U.S. PATENT DOCUMENTS

| | | | |
|---|---|---|---|
| 10,102,597 B1* | 10/2018 | Castonguay | |
| 2005/0288958 A1* | 12/2005 | Eraker | G06Q 30/00 705/316 |
| 2011/0238477 A1* | 9/2011 | Urbanski | G06Q 30/0224 705/14.25 |
| 2012/0203846 A1* | 8/2012 | Hull | G06Q 10/107 709/206 |
| 2017/0270580 A1* | 9/2017 | Esposito | G06Q 30/0613 |

OTHER PUBLICATIONS

"EasyPropertyListings.com, Advanced Maps Extension v2.1 Released, Mar. 1, 2016, easypropertylistings.com" (Year: 2016).*

* cited by examiner

*Primary Examiner* — William J Allen
*Assistant Examiner* — Maria S. P. Heath
(74) *Attorney, Agent, or Firm* — Norton Rose Fulbright Canada LLP; Maya Medeiros

(57) ABSTRACT

A posting platform generates an interface for the purchase demand of real estate assets. The interface includes a visual representation of a geographic region of real estate assets. The visual representation has one or more visual elements of purchasers interested in the real estate assets within the geographic region. The visual elements indicate the purchasers interested in a location within the geographic region at an asset or house level, a neighbourhood level, and a street level, in some embodiments. The visual representation has visual elements for an RTP score for each purchaser of the view or posting of purchasers. The RTP score is calculated based on one or more RTP factors.

19 Claims, 16 Drawing Sheets

| Buyer | Message<br>Open Social<br>View My Story | Owner |
|---|---|---|

Address + 10km $X^1$ $X^1$

= yes $X^1$

≠ no $X^2$ $X^3$ $X^4 = \boxed{X^1+k}$

= yes $X^1$ $X^2$ $X^3$   $X^4$ if $X^4 \leq X^1+k$

≠ no $X^4$ if $X^4 \geq X^1+k$

Street $X^2$ $X^2$

= yes $X^1$ $X^2$

≠ no $X^3$ $X^5 = \boxed{X^2+k}$

= yes $X^1$ $X^2$ $X^3$   if $X^3 \leq X^2+k$

≠ no $X^5$ if $X^5 \geq X^2+k$

Neighbourhood $X^3$ $X^6 = \boxed{X^3+k}$

= yes $X^1$ $X^2$ $X^3$

= yes $X^1$ $X^2$ $X^3$   $X^6$ if $X^6 \leq X^3+k$ $X^1$ =address

≠ no $X^6$ if $X^6 \geq X^3+k$

FIG. 16

PLATFORM FOR PURCHASE DEMAND OF ASSETS

FIELD

Embodiments described herein generally relate to a computing platform to provide data relating to the purchase demand of assets.

INTRODUCTION

Real estate transactions in North America typically follow a pattern whereby a real estate owner (owner) decides to offer their property for sale, enlists the assistance of a real estate agent, and proceeds to offer the property for sale. The cost of finding purchasers for the property typically requires extensive advertising, showing of the property to many unsuitable potential purchasers, lengthy negotiations, and frustrating delays. Little information is available for an owner about the potential demand for a specific property before offering the property for sale.

Similarly, for a potential real estate purchaser (purchaser), only basic online tools or traditional print media are available to search the inventory of properties that are currently listed. There are no mechanisms to assist a purchaser in indicating specific preferences for real estate to owners of property not currently listed for sale. The process overall is expensive, time consuming, and inefficient for all parties.

SUMMARY

In accordance with one aspect, there is provided a platform to provide potential vendors or owners of assets, such as real estate, or property with information regarding the number of potential purchasers of that property.

In accordance with one aspect, there is provided a platform to provide potential vendors of property with information regarding the readiness to purchase or quality of each potential purchaser. The information includes a visual representation of a readiness to purchase score for each potential purchaser, the readiness to purchase score linked to a geographic area or real estate asset.

In accordance with one aspect, there is provided a platform of providing market information to an owner of a property to aid in making the determination of which sales process would be most efficient and one or more purchasers interested in one or more real estate assets.

In accordance with one aspect, there is provided a platform for generating a visual representation of a geographic region of real estate assets, the visual representation having one or more visual elements of an aggregated view or posting of purchasers interested in the real estate assets within the geographic region, each visual element indicating the purchasers interested in a location within the geographic region at an asset or house level, a neighbourhood level, and a street level, the visual representation having one or more visual elements for a readiness to purchase (RTP) score for each purchaser of the view or posting of purchasers, the RTP score calculated based on one or more RTP factors.

In accordance with one aspect, there is provided a platform for receiving data indicating purchase interest in one or more real estate assets from one or more purchasers, generating a RTP score for each of the one or more purchasers using weighted RTP factors derived from a profile for the respective purchaser and generating an interface for purchase demand of the one or more real estate assets, the interface having a visual representation of the geographic region of the one or more real estate assets, the visual representation having one or more visual elements of an aggregated view or posting of the one or more purchasers interested in the real estate assets within the geographic region, each visual element indicating the RTP score for each of the one or more purchasers.

In accordance with one aspect, there is provided a platform that provides urban and commercial planners and developers and real estate investors with purchaser demand defined by geographic region and real estate type criteria.

In accordance with one aspect, there is provided a process for real estate asset management comprising receiving data indicating purchase interest in one or more real estate assets from one or more purchasers, generating a RTP score for each of the one or more purchasers using weighted RTP factors derived from a profile for the respective purchaser and generating an interface for purchase demand of the one or more real estate assets, generating a visual representation of the geographic region of the one or more real estate assets, the visual representation having one or more visual elements of an aggregated view or posting of the one or more purchasers interested in the real estate assets within the geographic region, each visual element indicating the RTP score for each of the one or more purchasers, displaying the visual representation on the interface at a computing device.

In accordance with one aspect, there is provided a platform with a processor configured to generate data indicating purchase interest in one or more assets from one or more purchasers, generate a RTP score for each of the one or more purchasers using weighted RTP factors derived from a profile for the respective purchaser, and generate an interface for purchase demand of the one or more assets, the interface having a visual representation of the geographic region of the one or more assets, the visual representation having one or more visual elements of aggregated postings of one or more purchasers interested in the one or more assets within the geographic region, and the RTP score for each of the one or more purchasers.

In some embodiments, the processor is configured to receive additional data indicating additional purchase interest in the one or more assets from one or more additional purchasers and dynamically update, at the interface, the one or more visual elements based on updated RTP scores from the additional data.

In some embodiments, the RTP score is a numeric or graded value that is transformed to visually indicate the calculated readiness, ability or likelihood of a purchaser to complete a transaction for the one or more assets.

In some embodiments, the RTP factors are weighted based on their significance to a readiness to purchase, wherein the processor refines the weight values using feedback and machine learning rules, the rules corresponding to different RTP factors and processed transactions.

In some embodiments, the platform has a matching address engine that correlates owner registered addresses to purchaser posted addresses to release owner message functionality and to access specific private purchaser fields.

In some embodiments, the platform has an inter-user message tool to allow an owner device and a purchaser device to exchange electronic messages, wherein the processor records electronic message data in message data storage.

In some embodiments, the pone or more assets comprise real estate assets.

In some embodiments, the platform has a network interface with third party services to receive input data relating to purchasers, owners, real estate assets, geographic locations; an aggregator that correlates the received input data for the RTP factors and information in the profiles of the purchasers, data received from aggregator, real estate properties, geographic data, historical data, behavioural data, and achievements, wherein the processor is configured to update, at the interface, the one or more visual elements based on updated RTP scores with the aggregated data.

In some embodiments, the processor is configured to connect with an owner device, generating a request to find purchaser posts on a geographic region, processing the posting request and triggering a purchaser posting and a RTP score for each purchaser in the purchaser listing and rank the purchasers according to the RTP score.

In some embodiments, the purchaser posting request has configurations or preferences for generating the RTP score, including a selection of RTP factors and a suggested weighting or other indicated importance of one or more of the RTP factors.

In some embodiments, the processor determines that the owner device has not registered and provided a profile address identifier that corresponds to the geographic region, and renders the owner device unable to send electronic messages or gain access to purchaser private data.

In some embodiments, the processor is configured to provide potential vendors of property with access to the interface and information regarding the number of potential purchasers of the one or more assets.

In some embodiments, the processor is configured to provide potential vendors of the one or more assets with information regarding the RTP score for each potential purchaser, the information including the visual representation.

In some embodiments, the processor is configured to provide market information to an owner of the one or more assets to make a determination of a sales process.

In accordance with one aspect, there is provided a process for asset management comprising: receiving data indicating purchase interest in one or more assets from one or more purchasers, generating a RTP score for each of the one or more purchasers using weighted RTP factors derived from a profile for the respective purchaser, generating an interface for purchase demand of the one or more assets, generating, at the interface, a visual representation of the geographic region of the one or more assets, the visual representation having one or more visual elements of an aggregated view or posting of the one or more purchasers interested in the assets within the geographic region, each visual element indicating the RTP score for each of the one or more purchasers, displaying the visual representation on the interface at a computing device, receiving additional data indicating additional purchase interest in the one or more assets from one or more additional purchasers, and dynamically updating, at the interface, the one or more visual elements based on updated RTP scores with the additional data.

In some embodiments, the process involves weighting the RTP factors based on their significance to a readiness to purchase, refining the weight values using feedback and machine learning rules, the rules corresponding to different RTP factors and processed transactions.

In some embodiments, the process involves correlating owner registered addresses to purchaser posted addresses to release owner message functionality and to access specific private purchaser fields.

In some embodiments, the process involves receiving, at a network interface with third party services, input data relating to purchasers, owners, real estate assets, geographic locations; correlating the received input data with the RTP factors and information in the profiles of the purchasers, real estate properties, geographic data, historical data, behavioural data, and achievements, and continuously updating, at the interface, the one or more visual elements based on updated RTP scores with the aggregated data.

In some embodiments, the one or more assets comprise real estate assets.

In accordance with one aspect, there is provided a device with a processor configured to dynamically generate a visual representation of a geographic region of real estate assets at an interface on a display, the visual representation having one or more visual elements of an aggregated view or posting of purchasers interested in the real estate assets within the geographic region, each visual element indicating the purchasers interested in a location within the geographic region at an asset or house level, a neighbourhood level, and a street level, the visual representation having one or more visual elements for an RTP score for each purchaser of the view or posting of purchasers, the RTP score calculated based on one or more RTP factors, the RTP score being a numeric or graded value that is transformed to visually indicate the calculated readiness, ability or likelihood of a purchaser to complete a transaction for the one or more assets.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 16 show an example of communications that can be enabled by matching purchaser's posted geographic region address, street or neighbourhood AND/OR optional extension within kilometer(s) radius, to an owner's registered address. In the example, communication is enabled for an address, an address within 10 km, an address on the street, and an address within the neighborhood.

DETAILED DESCRIPTION

Embodiments relate to an improved method and platform that provides information about the specific demand for an owner's property or similar properties, so that they can select an efficient method, an appropriate time, and an optimal purchaser for a sale transaction. Embodiments relate to an improved method and platform that provides information about potential purchasers including a score representing an intent, ability or potential to purchase property.

Embodiments of methods, systems, and apparatus are described through reference to the drawings. An example transaction is a real estate transaction. There can be different types of transactions in other embodiments.

Figure 1:
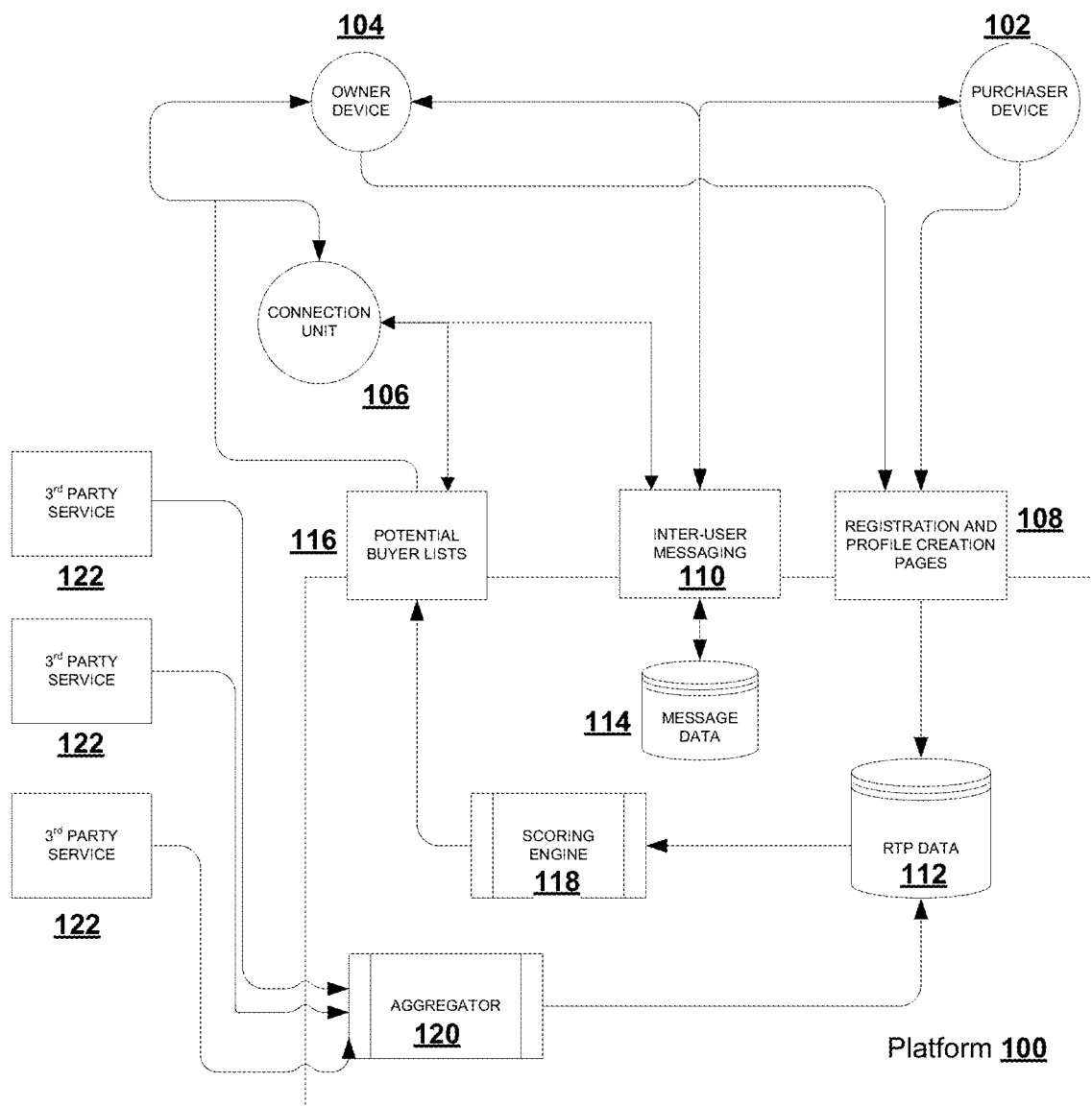
FIG. 1 shows an example of posting, scoring and messaging platform.

FIG. 1 illustrates an example platform 100 for posting and scoring real estate assets and related entities, such as purchasers and owners. Platform 100 connects a purchaser device 102 and an owner device 104 to transmit and receive information relating to real estate assets and related entities. The platform 100 also enables messaging between the purchaser device 102 and the owner device 104. For simplicity, the example shows only one purchaser device 102 and one owner device 104. Platform 100 connects to multiple purchaser devices 102 and owner devices 104 to transmit and receive information relating to multiple real estate assets and related entities. FIG. 1 shows a combination of interconnections and process flows.

The platform 100 provides a method for potential purchasers to indicate which properties they have an interest in purchasing, whether or not the specific property is currently listed for sale. The purchaser device 102 provides electronic indications relating to interests in property to platform 100. For example, the electronic indications can be posts for a neighborhood of interest, posts for addresses of interest, and posts for streets of interest. The platform collects the electronic indications using an interface and stores the electronic indications in a data storage device, along with additional specific information about each purchaser and other metadata from purchaser device 102 (e.g. date and time stamp for the electronic indications, browsing history, viewed properties). The additional specific information provided by the purchaser is presented by the platform 100 on an interface accessible to an owner device 104 (for the owner of the real asset of interest or another real estate asset) and the purchaser device 102 (for the same or another purchaser). The interface presents the information in a manner that establishes confidence that the intent and ability to purchase is genuine using a Readiness to Purchase (RTP) score or metric. The interface generates and displays a visual representation of the RTP score. In addition, the platform 100 also provides additional mechanisms to further exchange information between the purchaser device 102 and the owner device 104 to further increase the owner's confidence in engaging with the potential purchaser to explore whether to start or continue with a transaction.

Based on the information presented in the interface for owner device 104, the owner has an improved understanding of whether to proceed with acts for a transaction, including sending a message to a purchaser who has posted an interest within the owner's geographic region. This may provide a mechanism for a more direct negotiation with a specific interested party, instead of pursuing a less efficient approach of advertising to a wide market, for example.

In one embodiment, the RTP score represents the overall readiness of a purchaser to complete a specific transaction. The platform 100 computes the RTP score using multiple factors indicating a RTP for one or more potential purchasers. The platform 100 presents the RTP score as a number or other visual element indicating a 'readiness to purchase'. This permits competitive purchasers to be presented in a ranked or other visually comparative form to an owner, indicating both the competitive interest and quality of interest simultaneously. Different purchase factors are used to evaluate and compute the RTP score for different embodiments. The RTP factors may be weighted based on their significance to the readiness to purchase. The weight values may be hard coded or user configurations. The weight values can be refined with feedback and machine learning, for example. The rules may correspond to the different RTP factors and processed transactions to generate a feedback loop during a training phase, for example.

An embodiment of the platform 100 provides information for purchasers and owners of real estate. Other embodiments may apply to other properties and transaction types. In particular, real estate has buyer qualification metrics, such as financing, previous home ownership, demographic information and other metrics. Other selling environments may have different buyer qualification metrics. For example, buyer qualification in an automotive market may involve buyer qualification metrics such as insurability, license status, financing, and previous automobile ownership, among others.

FIG. 1 shows different components of the platform 100 and their interconnections. Purchaser device 102 connects with platform 100 to register, create an account and a purchaser profile 108. Owner device 104 connects with platform 100 to register an address and create an account 108. Platform 100 generates an interface for receiving and displaying data for purchaser profiles 108. The interface can be a web or mobile application interface. Platform 100 has a matching address engine that correlates owner registered addresses to purchaser posted addresses to release owner 'send message' functionality and to access specific private purchaser fields. Platform 100 has an inter-user message tool 110 to allow owner device 104 and purchaser device 102 to exchange electronic messages. Platform 100 records electronic message data in message data storage 114.

Platform 100 connects with third party services 122 to receive input data relating to purchasers, owners, real estate assets, geographic locations, and other related data. An aggregator 120 correlates the received data for input to the RTP unit 112. The RTP unit 112 calculates RTPs metrics for purchasers using RTP factors, such as information in profiles 108, data received from aggregator 120, real estate properties, geographic data, historical data, behavioural data, readiness criteria, achievements, and so on. The RTP unit 112 stores the RTP data and updates the stored data in response to receiving new or updated profiles 118 and data from aggregator 120. Further details on the RTP scoring process are provided herein.

The owner device 104 connects with platform 100 and sends a request to find purchaser posts on a geographic region. The platform 100 processes the posting request and triggers purchaser posting unit 116 to generate and return a purchaser posting. The purchaser posting unit 116 interacts with scoring engine 118 to generate a RTP score for each purchaser in the purchaser listing using the RTP unit 112. The purchaser posting unit 116 returns a purchaser posting that indicates each purchaser and a corresponding RTP score. The purchaser posting unit 116 may rank the purchasers according to the RTP score and membership status, and most recent post, for example. The purchaser posting request may include configurations or preferences for generating the RTP score, including a selection of RTP factors and a suggested weighting or other indicated importance of one or more of the RTP factors. A connection unit 106 receives a connection request from owner device 104 to connect with a purchaser device 102 for the purchaser posting. In response, the connection unit 106 interacts with messaging unit 110 to generate and transmit an electronic message to the purchaser device 102 associated with the selected purchaser. The messaging unit 110 provides a messaging interface to connect the owner device 104 and the purchaser device 102.

Figure 2:
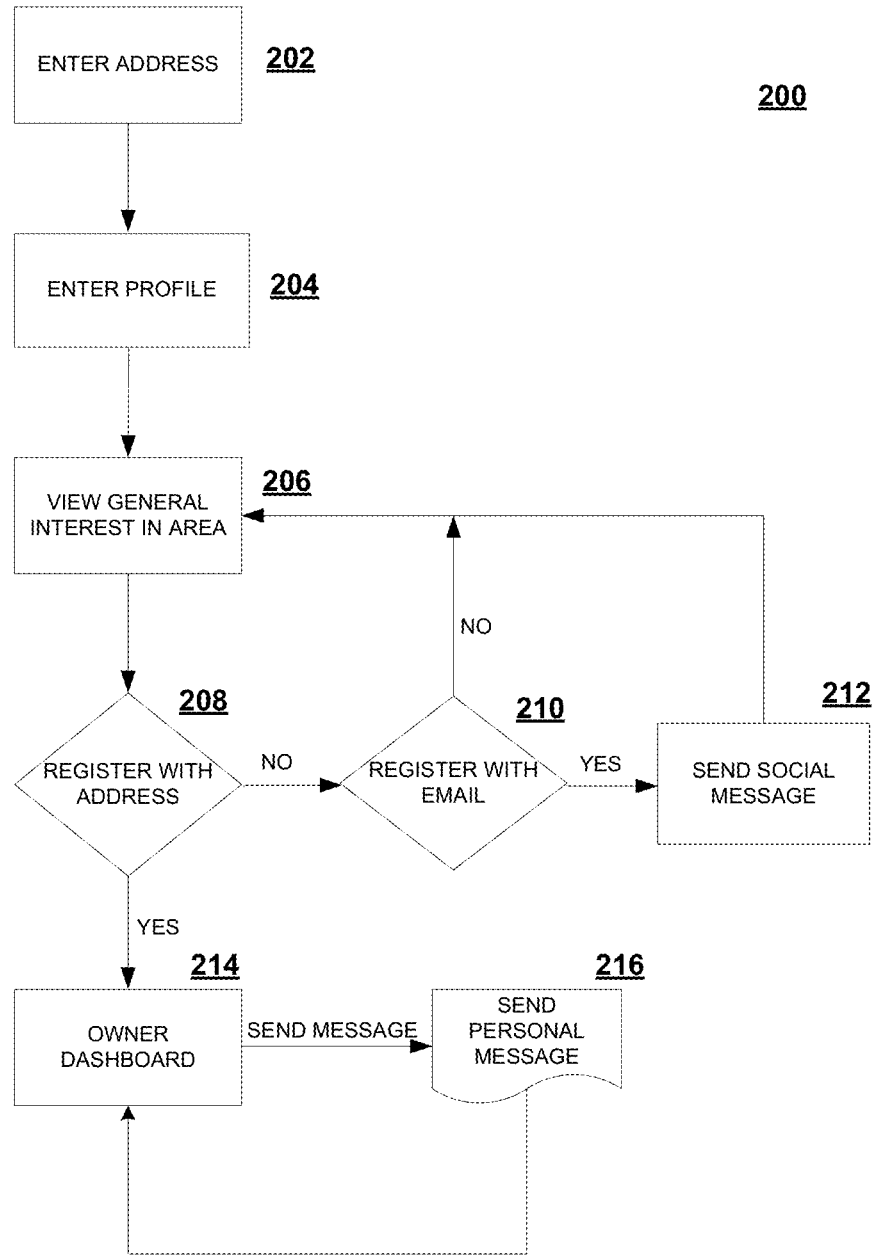
FIG. 2 shows an example process for a real estate asset owner device.

FIG. 2 shows an example process 200 for a real estate asset owner device 104. The owner device 104 connects with platform 100 to display an interface with visual elements for viewing potential purchasers, RTP scoring and messaging. At 202, the owner device 104 indicates an address for one or more real estate assets owned or managed by the owner operating owner device 104, for example. The owner device 104 may be prompted to log-in using a profile or account identifier or provide a password. At 204, an interface at the owner device 104 displays a profile page for the owner based on the address and the provided identifier. At 206, the interface at the owner device 104 displays a visual representation of general interest by purchaser(s) in the area or region for the address. If the owner device 104 has not registered with a profile address identifier, then at 208, the owner device 104 is prompted (via interface) to register based on the provided address. At 210, the owner device 104 provides an email address for registration. At 212, the platform 100 sends a message between owner device 104 and purchaser device 102, where the message can indicate the email address of the owner operating owner device 104. If the owner device 104 confirms registration based on the provided address then at 214 the owner device 104 displays an owner dashboard (via interface). The owner device 104 provides other data including an electronic address, name, address information for one or more real estate assets, other information for real estate asset(s), verification data to validate ownership of the real estate asset(s) and validate owner identification information, and so on. The owner dashboard enables the owner to indicate a request to send an electronic message to one or more purchaser devices 102. The owner dashboard may include visual representation of one or more potential purchasers who have posted interested in the owner's registered address or street or neighborhood. The owner dashboard includes a visual representation of purchasers with corresponding RTP scores, specific purchaser profile fields that contribute to the RTP score, access to private social data, and electronic messages. The RTP scores may be indicated by one or more visual elements to indicate an aggregated RTP score along with metrics for one or more RTP factors used to compute the RTP score. At 216, the owner device 104 provides information for a personal electronic message and the message is sent to a purchaser device 102. If the owner device 104 has not registered and provided the profile address identifier that corresponds to the purchaser's geographic region of the post, the owner returns to 206 and is unable to send electronic messages or gain access to specific purchasers private data.

Figure 3:
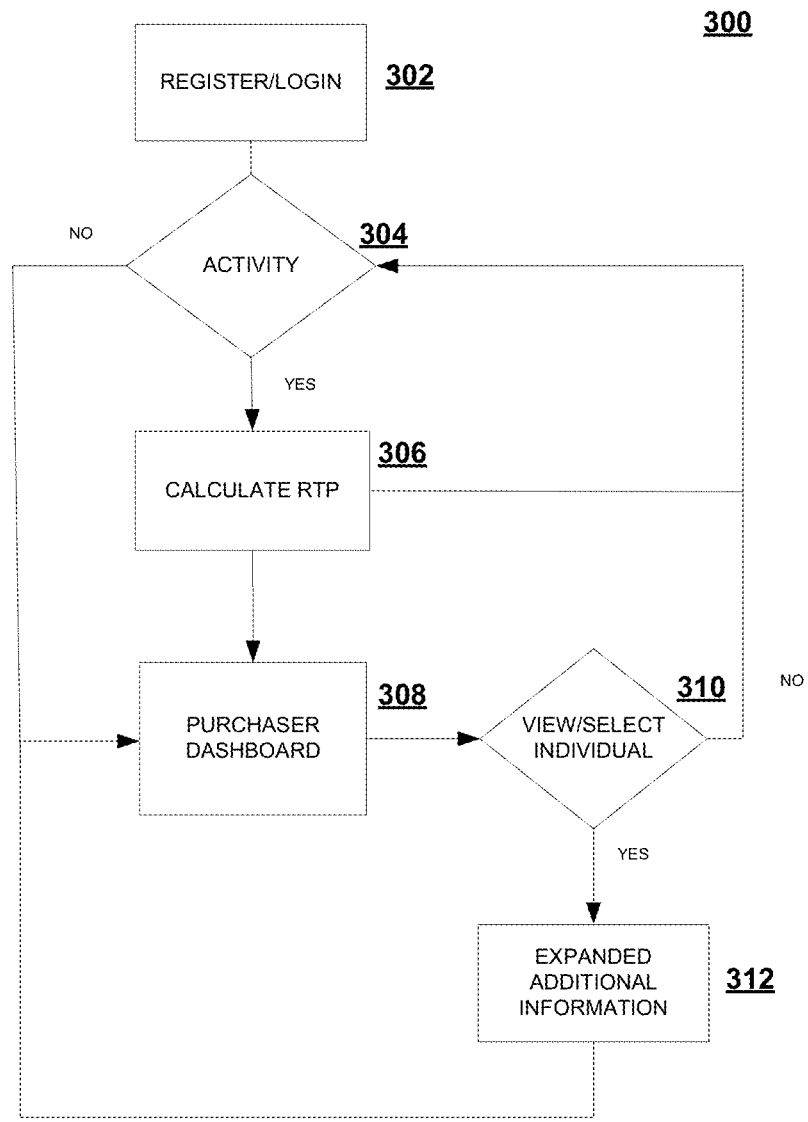
FIG. 3 shows an example process for a real estate asset purchaser device.

FIG. 3 shows an example process 300 for a real estate asset purchaser device 102. The purchaser device 102 connects with platform 100 to display an interface for posting, scoring and messaging. At 302, the purchaser device 102 registers or logs into the platform 100 to access its profile 108. The purchaser device 102 provides a profile identifier, for example, or other identification information. At 302 the purchaser device 102 provides information to register as a basic member or Top Purchaser member. A "Top Purchaser" member has access to a preferred purchaser subscription program that provides additional features for a fee, for example. Basic members register with an email and password. Top Purchaser members register with an email, password and have optional fields to complete that can improve their purchaser RTP score. Example fields may include profile photo, time frame to purchase and/or close, available resources such as financing and legal resources, social media profiles (e.g. information for a My Story page), mutual connections including associations, workplace, activities, home search criteria including bedrooms, bathrooms, and so on. In some embodiments, completion of more fields increases a purchaser's RTP score. The purchaser device 102 displays a visual representation of its profile.

At 304, the platform 100 monitors activity of purchaser device 102. For example, the purchaser device 102 indicates or posts a general interest in a neighbourhood or geographic region, an address or house (e.g. a specific real estate asset), a street, or a combination thereof. The platform 100 detects and records this posting activity to calculate the RTP score at 306. The purchaser device 102 may provide a visual representation of the area or region for the neighbourhood, address, or street. The purchaser may upload private photos, comments and share the address, which is captured by platform 100 as activity at 304. The purchaser dashboard enables the purchaser to register one or more neighbourhoods, addresses, or streets of interest. At 306, platform 100 calculates an RTP score for the purchaser. The RTP score is calculated with inputs from monitored activity at 304. Other examples of monitored activity include user activity metrics such as registration type, saves, click through within site, site travelled from, shares, visits, resources such as funding and legal, owned previously, home checklist, fields completed, time parameters for example. The platform 100 returns to 304 to continuously monitor activity of purchaser device 102 to capture additional data to compute an updated RTP score at 306. At 308, the purchaser device 102 displays a purchaser dashboard of posted saved address or geographic regions of interest based on the neighbourhood, address, or street. The purchaser dashboard also provides a visual representation of the address corresponding to the post or stored item. The purchaser's RTP scores may be indicated within the member's global menu within the logged in state by one or more visual elements to indicate an aggregated RTP score along with metrics for one or more RTP factors used to compute the RTP score.

At 310, the purchaser device 102 selects an individual item within the purchaser dashboard. At 312, the purchaser device 102 displays an updated purchaser dashboard with an expanded view of the item selected that may include purchaser's photos, comments, messages received and sent and the ability to share the item with another party. The purchaser device 102 can navigate back to the listing of real estate asset items to select additional items of interest. The platform 100 returns to 304 to continuously monitor activity of purchaser device 102 to capture additional data to compute an updated RTP score at 306. Selections at 310 may also be captured as activity by platform 100 at 304.

Figure 4:
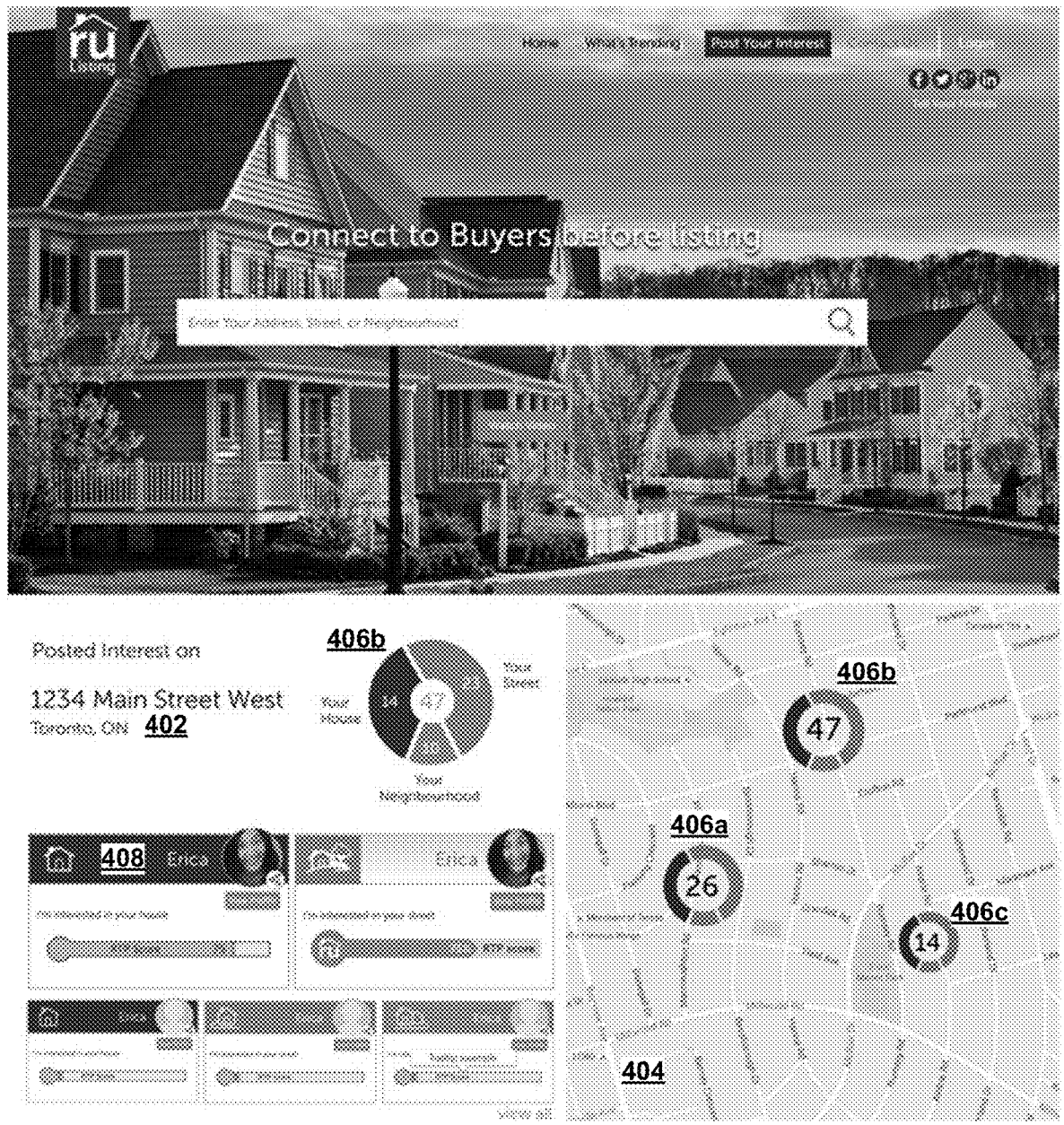
FIGS. 4 to 6 show example interfaces for posting, scoring and messaging platform.
Figure 5:
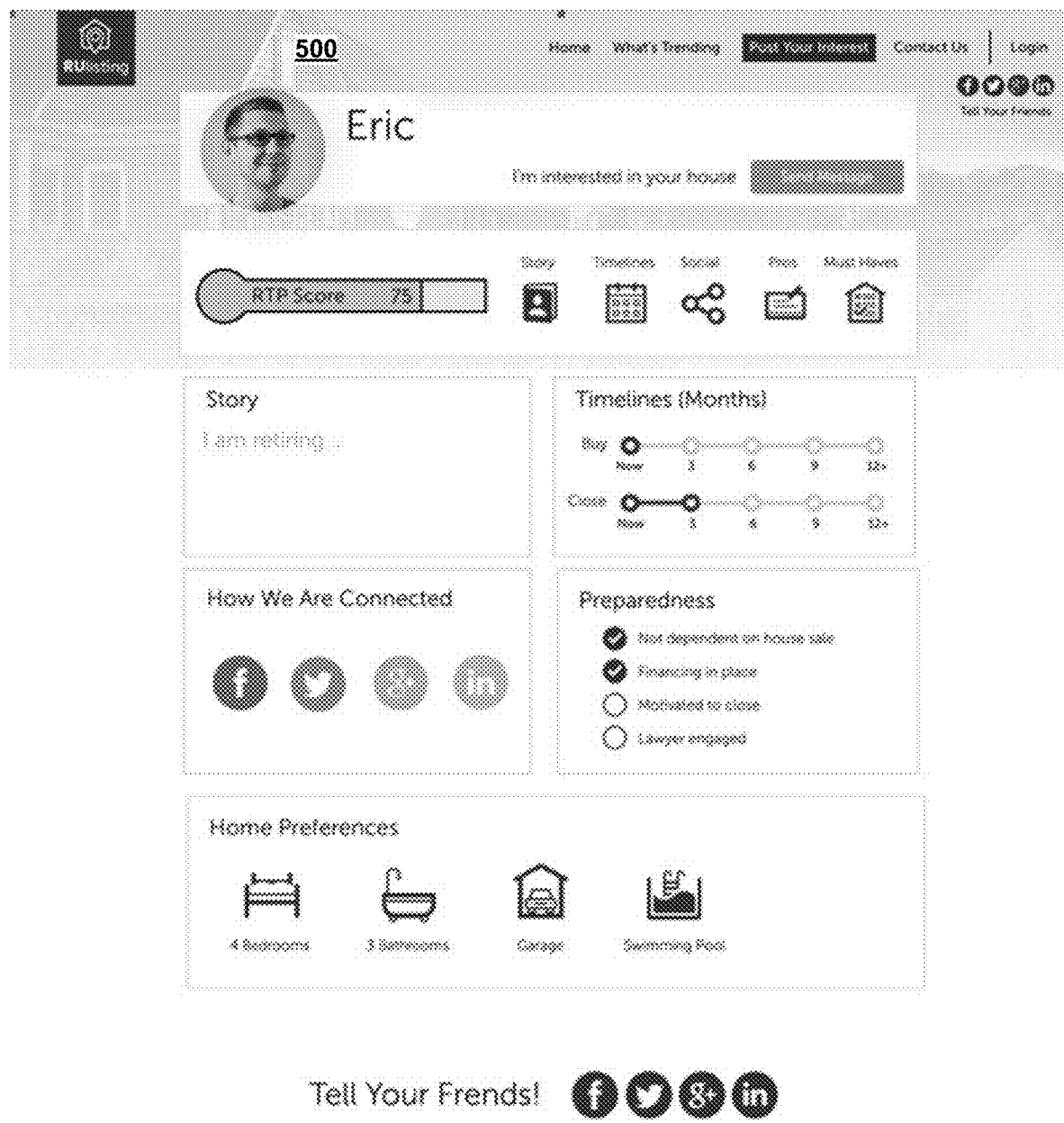
Figure 6:
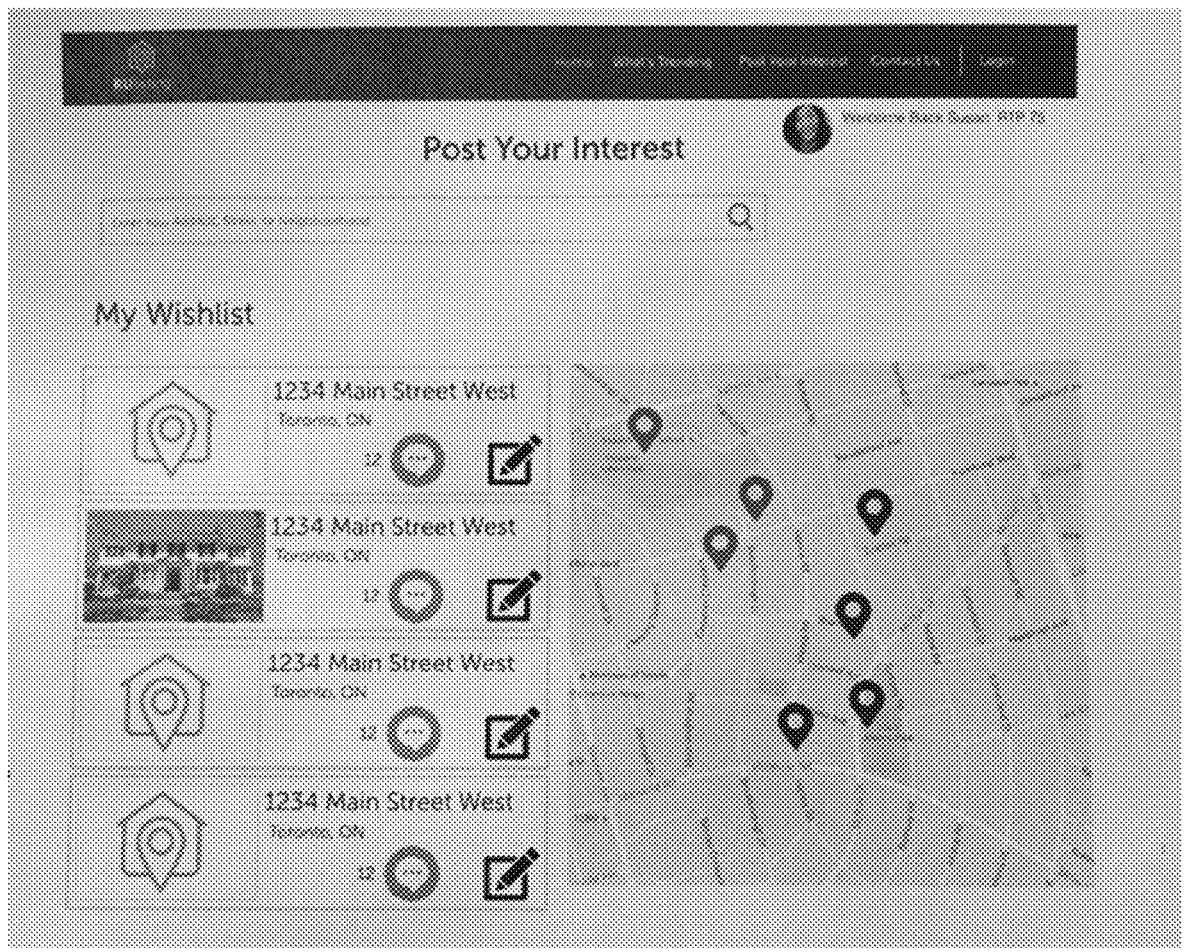

FIGS. 4 to 6 show example interfaces for the posting, scoring and messaging platform. FIG. 4 shows an interface 400 with a visual representation of a geographic region 404 of potential purchasers for a corresponding address 402 of interest to the owner or purchaser. Visual elements 406a, 406b, 406c represent an aggregated view or posting of purchasers interested in real estate assets within the geographic region 404. For example, a visual element 406a indicates 26 purchasers interested in a location within the geographic region 404. The visual element 406a breaks the interested purchasers into groupings based on the house address (e.g. particular real estate asset), the neighbourhood, and the street. For example, a visual element 406b indicates 47 purchasers interested in a location, with 23 interested in the street, 10 interested in the neighbourhood, and 14 interested in the house. The interface 400 also includes one or more visual elements representing an RTP score 408 for a purchaser (Erica in this example) interested in real estate assets in the geographic region 404.

FIG. 5 shows an interface 500 with a visual representation of a purchaser's profile (206a) for a purchaser including the RTP score and real estate asset preferences. The purchaser's profile includes visual elements for timeliness to purchase for both buying and closing. The purchaser's profile includes visual elements for preparedness to purchase including complete and incomplete factors. The purchaser's profile includes visual elements for real estate preferences.

FIG. 6 shows an interface 600 with a visual representation of a purchaser's dashboard (e.g. provided at 308 of FIG. 3) with posted and stored interests for real estate assets.

Figure 7:
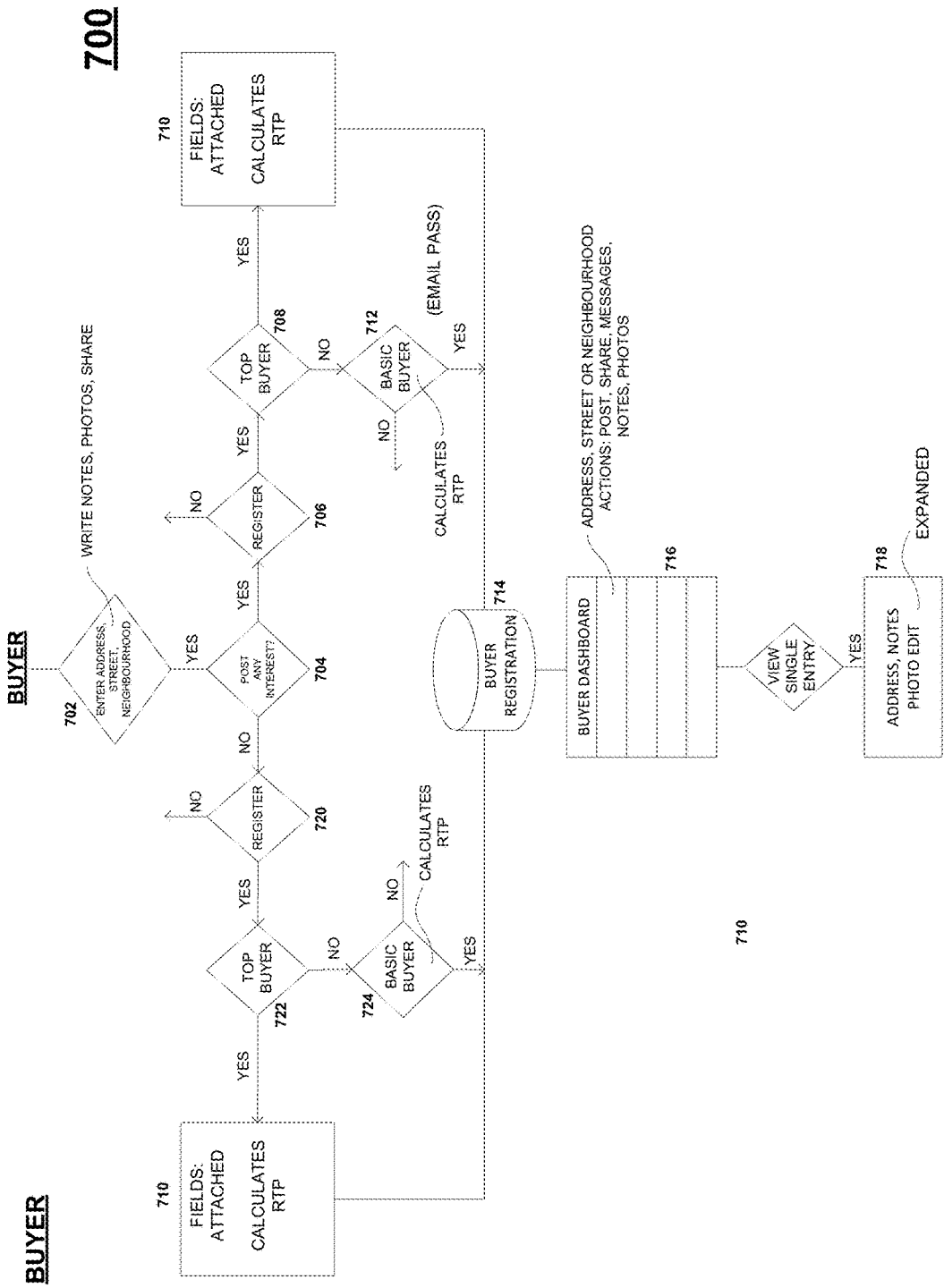
FIG. 7 shows an example process for a real estate asset purchaser device.

FIG. 7 shows an example process 700 for a real estate asset purchaser device 102. The process 700 is another example of the process 300 of FIG. 3. At 702, the platform 100 receives geographic data including an address, street, or neighbourhood. At 704, the platform 100 determines whether posted interest in one or more assets related to the geographic data is received. If so, at 706, the platform 100 determines whether to register a potential purchaser, and at 708, the platform 100 determines whether the potential purchaser is a top buyer. At 710 or 712, the platform 100 calculates an RTP score for the potential purchaser in view of the one or more assets. At 714, the platform 100 registers the potential purchaser, and generates and stores a purchaser record in the data store. At 716, the platform 100 generates a purchaser dashboard on interface. At 718, the platform 100 generates an entry view at the interface. At 720, the platform 100 determines whether to register a potential purchaser, and at 722, the platform 100 determines whether the potential purchaser is a top buyer. At 710 or 724, the platform 100 calculates an RTP score for the potential purchaser in view of the one or more assets.

Figure 8:
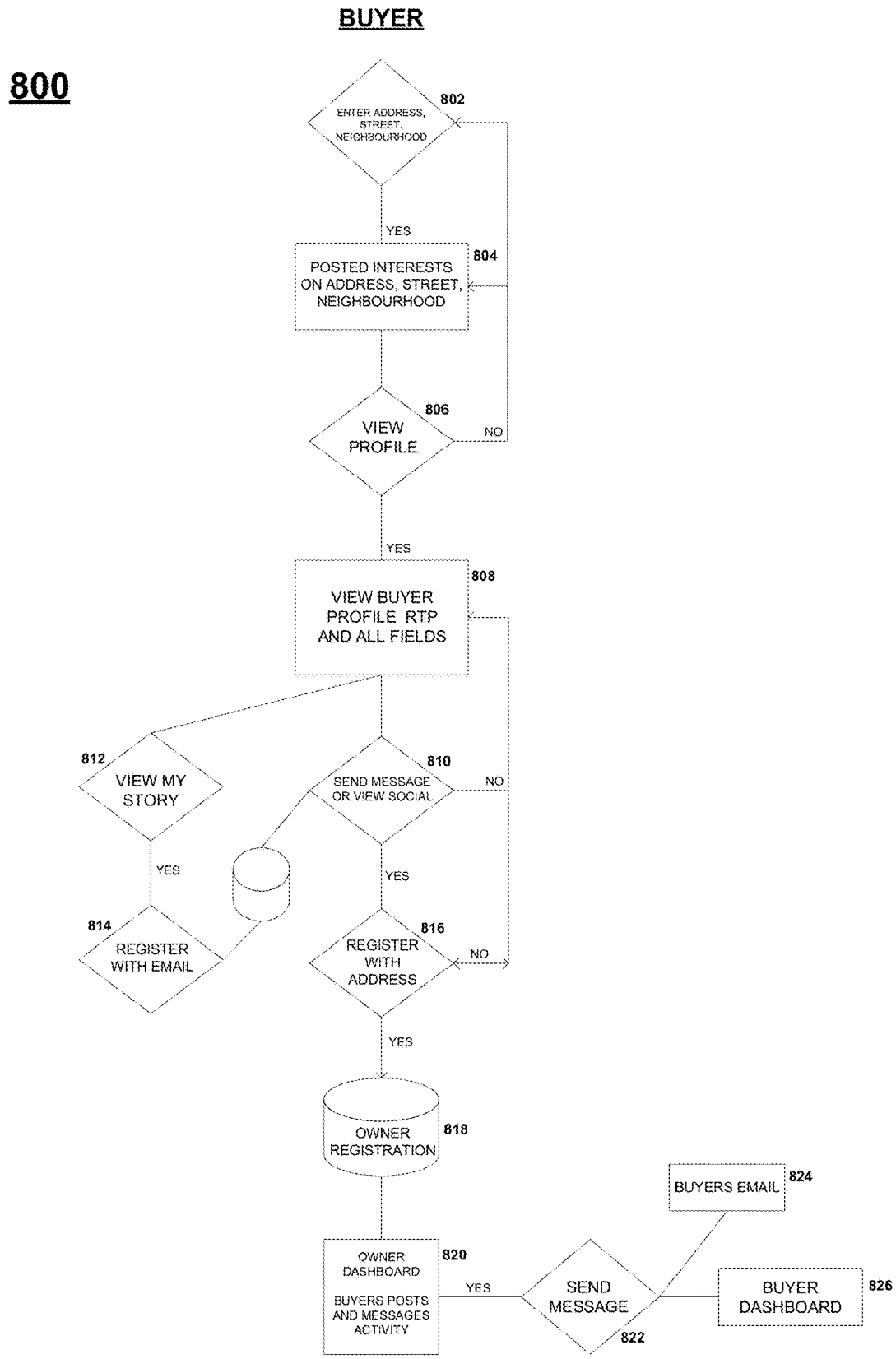
FIG. 8 shows an example process for a real estate asset owner device.

FIG. 8 shows an example process 800 for a real estate asset owner device 104. The process 700 is another example of the process 200 of FIG. 2. At 802, the platform 100 receives geographic data including an address, street, or neighbourhood. At 804, the platform 100 determines whether posted interest in one or more assets related to the geographic data is received. At 806, the platform 100 determines whether a view profile command is received. If so, at 808, the platform 100 display purchaser profile, linked RTP score and additional data fields from the purchaser record. At 810, the platform 100 sends a message to the purchaser. At 812, the platform 100 displays a story with data regarding the purchaser or vendor and, at 814, the platform 100 can register the purchaser or vendor using an email address. At 816, the platform 100 can register the vendor using an address identifier. At 818, the platform 100 registers the vendor by creating and storing a vendor record. At 820, the platform 100 generates an owner or vendor dashboard at interface. At 822, the platform 100 generates and transmits a message to the vendor or purchaser. At 824, the platform 100 connects to purchaser email and at 826 generates a purchaser dashboard.

Figure 9:
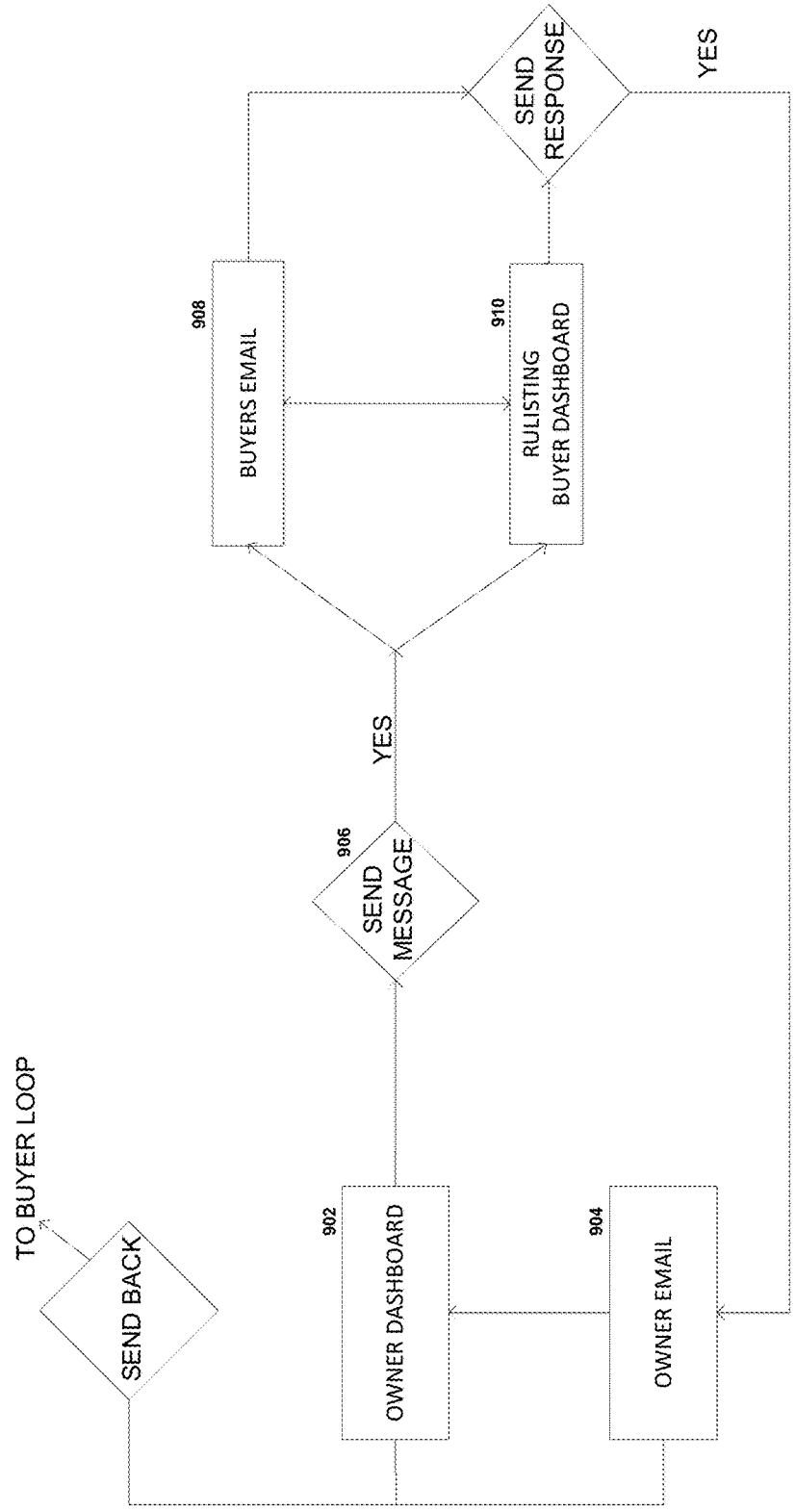
FIG. 9 shows an example process for messaging contact device.

FIG. 9 shows an example process 900 for a first point of contact for messaging a device (e.g. owner device 104, purchaser device 10). The process 900 involves receiving a message request from an owner device 10 from an indicator on the owner dashboard (at 902) or from the owner's email (at 904). A message is generated and transmitted at 906 to either the purchaser's email (908) or the purchaser dashboard (910).

Figure 10:
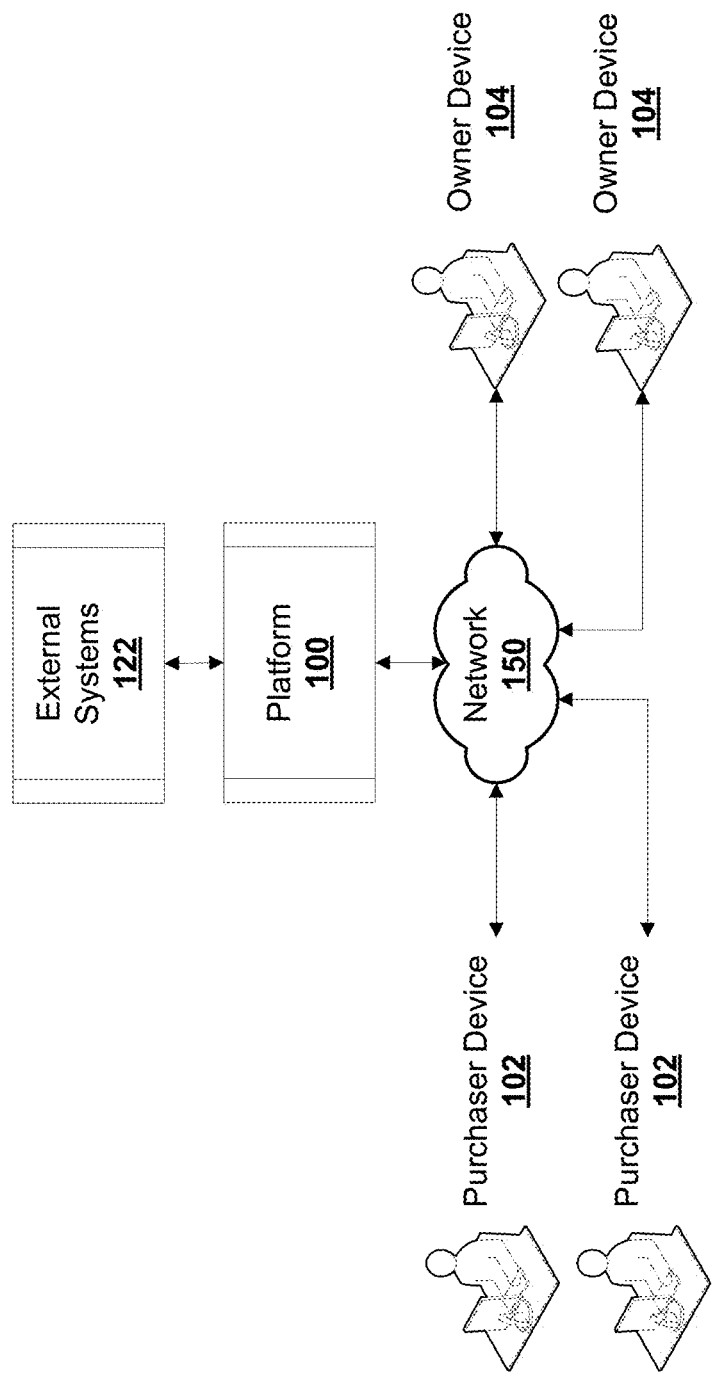
FIGS. 10 and 11 show example of posting, scoring and messaging platforms.
Figure 11:
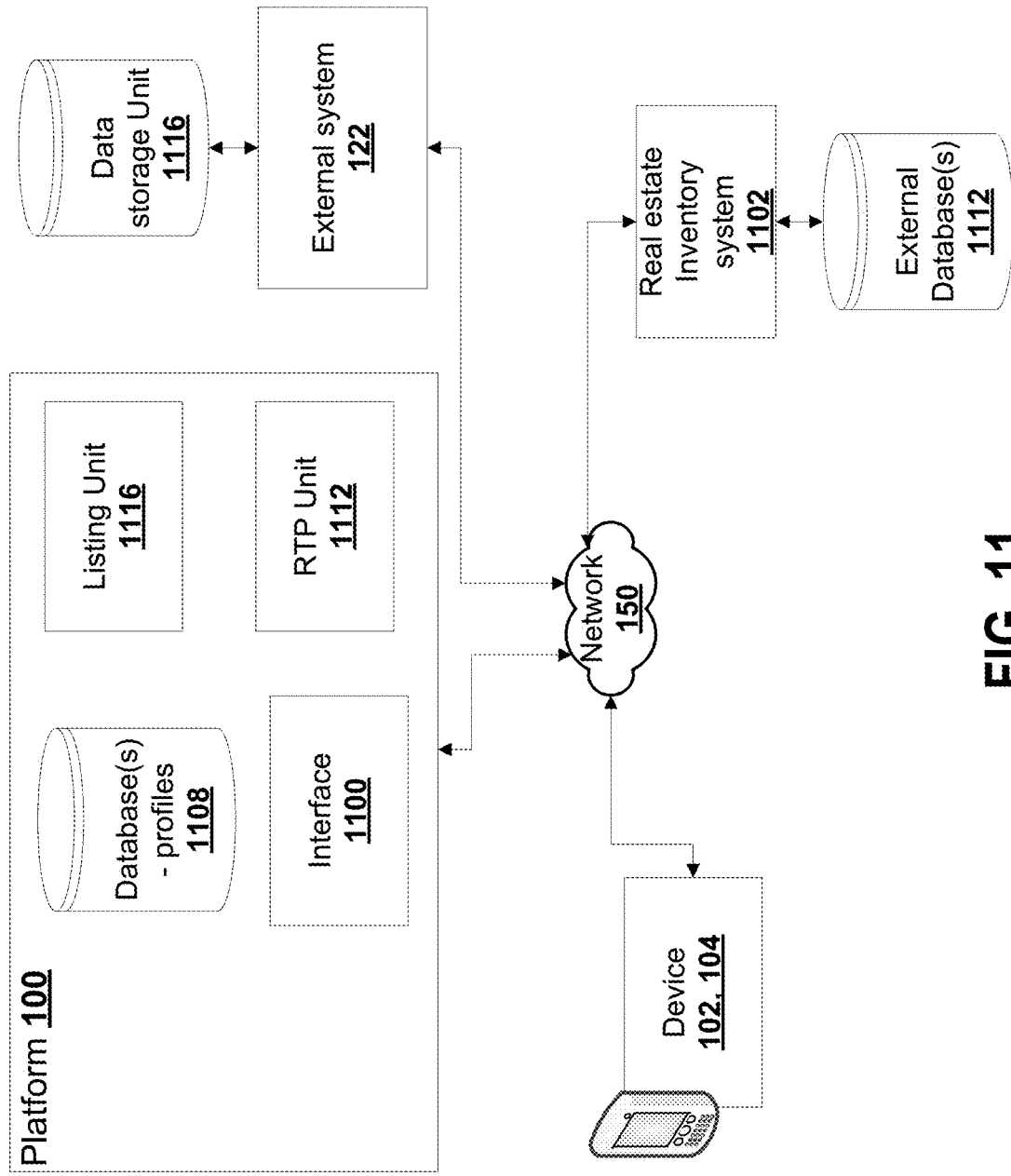

FIGS. 10 and 11 show other examples of posting, scoring and messaging platform 100. The components generally correspond to the components described in relation FIG. 1. Platform 100 includes a data storage device 1108 storing data populating profiles and RTP data, for example. Posting unit 1116 generates postings of purchasers interested in real estate assets at an address level, street level, and neighbourhood level. RTP unit 1112 collects data for RTP factors and computes RTP scores for purchasers. Interface 1110 collects and updates data from external systems 122 (coupled to data storage units 1116), purchaser device 102, owner device 104, and real estate inventory system 1102. The real estate inventory system 1102 may provide real-time data relating to real estate assets currently for sale and historical data relating to real estate assets sold for processing by platform 100. The real estate inventory system 1102 may access one or more external databases 1112 to access the real estate asset data. Interface 1100 monitors activity data from purchaser devices 102 which impacts RTP scores. Interface 1100 provides activity data to RTP unit 1112 to compute RTP factors based on the activity data.

Figure 13:
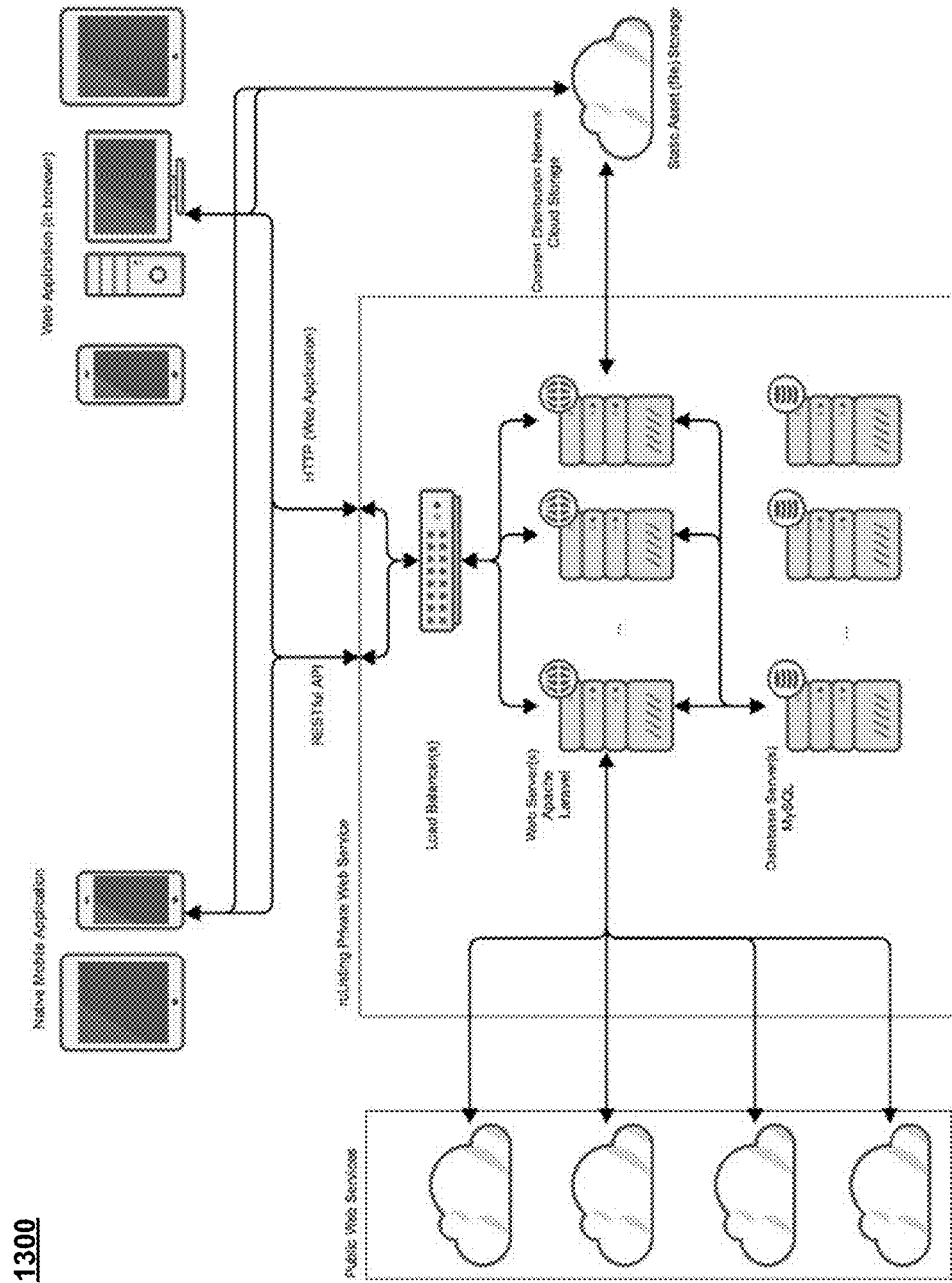
FIGS. 13 to 15 show example architectures for posting, scoring and messaging platform.
Figure 14:
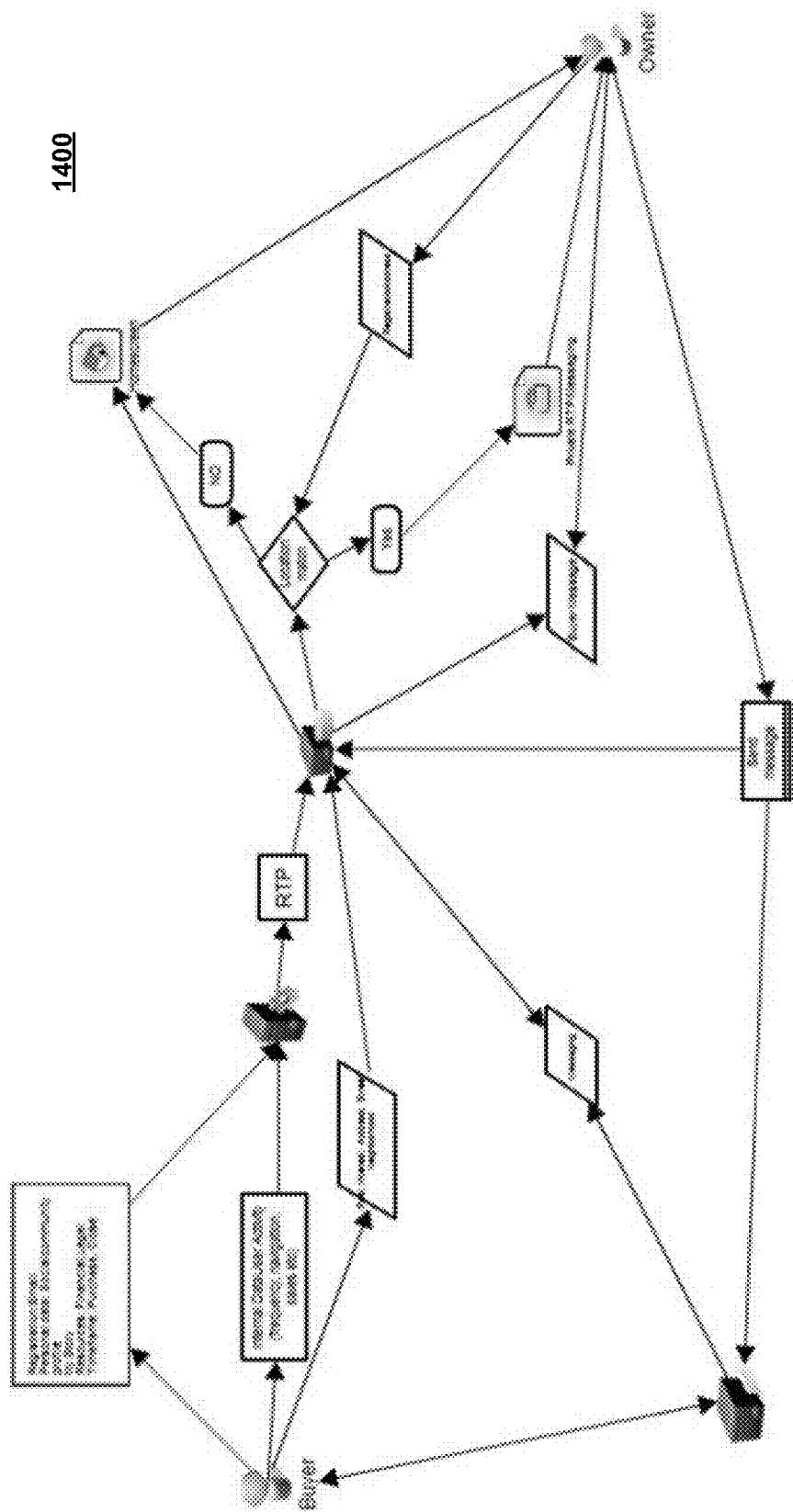
Figure 15:
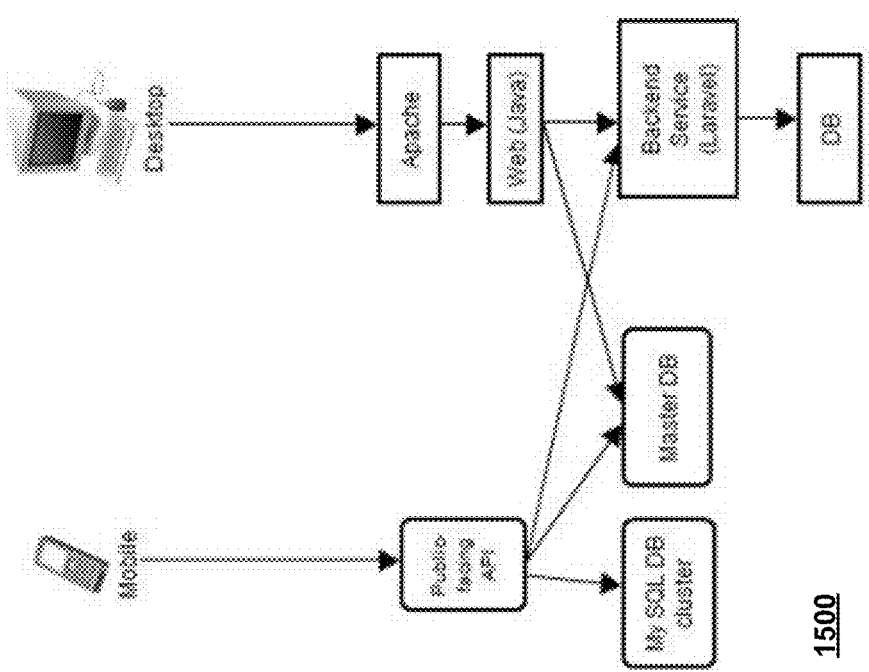

FIGS. 13 and 14 show other example architectures 1300, 1400 for the posting, scoring and messaging platform. FIG. 15 shows example architecture 1500 for a mobile and desktop application for purchaser device 102 and owner device 104.

FIG. 16 shows an example of matching a purchaser's posted geographic region address, street or neighbourhood and optional extension within kilometer(s) radius, to an owner's registered address. The example shows functionality that may be enabled or disabled depending on the real estate asset associated with the purchaser and owner.

Various terms are used herein to describe aspects of embodiments. For example, a purchaser refers to a person who seeks to engage another party for the purpose of exploring beneficial transaction including such actions as buying, leasing, acquiring an interest in, trading, cooperating with, annexing. A purchaser may also be a person who assigns intrinsic value to Real Estate assets. A purchaser may also be a person who seeks to acquire property of perceived or intrinsic value. RTP score is a numeric or graded value that indicates the calculated readiness, ability or likelihood of a purchaser to complete a property transaction. RTP factors are the input data that are used to generate a RTP score.

A purchase may refer to the act of acquiring Real Estate assets. A Real Estate asset is a property consisting of a thing, attribute, quality or characteristic of something. A Real Estate agent is a person who assists with buying and selling Real Estate. Property refers to any asset owned by a person or company having intrinsic value. Geography is an area defined by physical, temporal or logical relationships. Owner is a person who possesses Real Estate. A Demand is a desire to pursue the acquisition of Property. Property refers to any asset owned by a person, company or government having intrinsic value. RTP is a person's state of demand to buy Real Estate assets. A post is the act of putting up an advertisement within an environment.

Ready (Intent) to Purchase: RTP Score

Platform 100 computes an RTP score to represent the overall readiness of a purchaser to complete a specific real estate transaction. The platform 100 computes the RTP score using multiple RTP factors. The platform 100 presents the RTP score as a number or other visual element indicating a 'readiness to purchase' as part of a visual representation for a graphical user interface displayed on a display screen of purchaser device 102 and owner device 104. The RTP score permits competitive purchasers to be presented in a ranked or other comparative form to an owner device 104, indicating both the competitive interest and quality of interest simultaneously. Different purchase factors are used to evaluate and compute the RTP score for different embodiments. The RTP factors may be weighted based on their significance to the readiness to purchase. The weights may be hard coded and then refined with feedback and machine learning, for example. Owners can view specific fields (or RTP factors) within a purchaser's post that contributes to the RTP calculation.

The platform 100 uses a set of RTP factors or leading indicators, associated with pre-purchase behaviour that calculates a score measuring a consumer's likelihood (e.g. intent, immediacy) to purchase. The platform 100 may refine the RTP scoring process by receiving data regarding whether a purchaser acts on their purchase intention, for example.

RTP Factors or Leading Indictors

The following provides examples of different RTP factors used by platform 100 to compute an RTP score for a purchaser. The platform 100 derives the RTP factors by processing data received from external systems 122 and profiles 108, for example. The platform 100 derives the RTP factors using monitored activity data from purchaser device 102, as another example.

An example RTP factor Demonstrated Interest (I) has one or more fields including registration level (such basic member or a "Top Purchaser" preferred, elite member), website travelled from, number of visits, number click thru, number saves, sharing with spouse, and so on. This factor also considers real estate assets saved to their wish list. A Wishlist or "save for later" function helps purchasers remember real estate they liked but chose not to post right away. If they can get back to the listing easily, they are more likely to finish the transaction later.

An example RTP factor Means or Resources (R) to purchase has one or more fields including financing available or mortgage preapproval, first home or owned previously, lawyer secured, and so on.

An example RTP factor Definitive Purchase criteria (C) has one or more fields including home checklist, defined geographic parameters (address, street, neighborhood), and so on. An example RTP factor Defined Purchase time (T) has one or more fields including contract (buy) to possession date (close), and so on. An example RTP factor Motivation to purchase (M) has one or more fields including job relocation, trading up, moving to new neighborhood, and so on. The influence of need for closure on consumer's choice behaviour.

An example RTP factor Engage of the seller or vendor (E) has one or more fields including the act of purchaser posting x % score on purchase indicators 1-5 above i.e.: (I %+R %+C %+T %+M %)/0.639. An example RTP factor Disclosure of personal information (D) has one or more fields including posted interest, post social media within registration, community, reason for purchase or moving, and so on.

In an aspect, embodiments described herein provide a platform 100 and a process for enticement to engage with outlanders (unknowns) online. The platform 100 or method provides trustworthiness and reputation metric of an unknown party, whose combination of fields and transparency reduces an owner's perceived personal and financial risk and entices online engagement. The trustworthiness and reputation metric may involve the RTP score. The platform 100 or method increases trust and confidence within a peer to peer digital exchange through transparency of key personal data that entices an owner to initiate online communication. Collaborative consumption within P2P marketplaces rely on foundation of trust between users since they involve higher risks. There is a need for systems that reduce risk and measure users' trustworthiness. Trust plays a decisive role for a functioning model based on sharing. P2P marketplace creates a need for some type of online reputations system or mechanisms that reduces the uncertainty of transacting with strangers. Reputation and trust-fostering mechanisms.

In an aspect, embodiments described herein provide a platform 100 and a process for enticement to register and send messages between owners and (potential) purchasers. This builds on leveling out risk as an owner feels exposed with purchasers posting on their address, street or neighborhood. Owners register their property address to gain access to a purchaser's private data that is attached to the post on an owner's geographic region. In an aspect, embodiments described herein provide a platform 100 and a process for a platform 100 or method that provides a risk based incentive for a property owner to register private information to gain access to a purchaser's private RTP data and to initiate online communication. The act of posting and authorizing owners may provide further data for platform 100 analytics. This may be restricted to those owners of property restricted to defined geographic boundaries, access to personal (my story, partner interested, I am a contractor) and social profiles (LinkedIn) owners.

In an aspect, embodiments described herein provide a platform 100 and a process for improved vendor time efficiency that increases the immediacy of a sale by providing a ready supply of qualified purchasers and removing middlemen between the transactions. The platform 100 publicly displays a supply of qualified purchasers defined by likelihood or intent to purchase criteria, by geographic location and by purchase-to-close time parameters that negates the need to list a property on the market, reduces a property owner's time spent locating qualified purchasers and increases the immediacy of a sale.

In an aspect, embodiments described herein provide a platform 100 and a process for improved incentive to sell real estate assets. The platform 100 provides a supply of qualified purchasers, defined by likelihood or intent to purchase criteria, geographic location and purchase-to-close time parameters, that reduces a property owner's social pressure, commitment and cost associated with listing a home on the open market, providing an owner incentive to sell to maximize returns.

In an aspect, embodiments described herein provide a platform 100 for owners to connect directly online with a database of prospective purchasers prequalified by geographic region, home type criteria, RTP score and factors, before contacting a real estate agent and/or publicly listing their home for sale.

In an aspect, embodiments described herein provide a platform 100 and a process for improved estimate of mean time to purchase. The platform 100 combines RTP factors into an RTP score with a mean time to purchase and a probability of purchase.

In an aspect, embodiments described herein provide a platform 100 and a process for an improved core prediction tool. The platform 100 provides a core prediction tool of current and trending near term demand for properties defined by, but not limited to geographic, type criteria and purchaser profile characteristics and so on that support urban and commercial planning and development and reduces investment and financial risk.

In an aspect, embodiments described herein provide a platform 100 and a process for improved purchaser authorizing contact based on trust from owner with defined purchase criteria. The platform provides owners, defined and restricted to purchaser's criteria, the authorization to send solicitation messaging and emails purchasers within a peer to peer network. The platform 100 authorizes an owner, with property ownership defined and restricted to purchaser's geographic area, to send solicitation messages.

The platform 100 provides tangible and discernable output. For example, the platform 100 generates a visual representation for display on purchaser device 102 and owner device 104, where the visual representations includes one or more visual elements for an RTP score. The RTP score provides public disclosure of a purchaser's state of readiness to purchase that reduces an owner's time to qualify purchasers, reduces owner's personal risk within an online engagement cycle and entices owners to send a message/connect directly to purchasers with higher RTP scores. RTP score is a metric calculated by weightings of internal sources of data (usage) and external fields (self-selected data fields) completed by a purchaser that support a state of readiness to conduct a purchase. The fields may be verified by a trusted source.

An exemplary web-based score explanation service requires purchasers to only post or save an interest on a property, street or neighborhood, publication of a purchase to close timeline and additional validators as input. The platform 100 provides an explanation of the primary factors influencing the RTP score, where a rich data feed is provided to the facility implementing the process.

For example, the platform 100 generates a visual representation for display on purchaser device 102 and owner device 104, where the visual representations includes visual elements for a real estate purchase demand by address, street or neighborhood with defined home criteria (5 bed, 3 bathroom, condo) used as a core prediction tool.

Example RTP Calculation

The following is an example calculation for an RTP score for illustrative purposes. The platform may use weighted RTP factors as inputs for the RTP score computation. The following are example RTP factors with example weights:

I—Demonstrated Interest (5%)
R—Resources (20%)
C—Purchase Criteria (10%)
T—Time parameters (20%)
M—Motivation (8.9%)
E—Engagement (11.1%)
D—Disclosure (25%)
Demonstrated Interest (I)=5%

An example computation is: 5%×[{0.10 Registration×(1.0 Top Purchaser, 0.80 Basic)}+{0.50 Saves×(0.10 for 1, 0.70 for 2-5, 1.0 for 5+)}+{0.10 # Click Thru×(0.10 for 1, 0.70 for 2-5 or 1.0 for 5+)+{0.05 Site Travelled from×(1.0 from real estate sites)}+{0.10 Shared×(1.0 Yes/0 No)}+{0.15 # of visits×(0.10 for 1, 0.70 for 2-5, 1.0 for 5+)}

Another example computation is: 5.0%×[0.10×(1.0 Top Purchaser)]+[0.50×(1.0 for 5+ saves)]+[0.10×(1.0 for 5+ click thrus]+[0.05×(1.0 travelled from real estate site)]+[0.10×(1.0 for sharing)]+[0.15 (1.0 for 5+ visits)]I=5×(0.10+0.50+0.10+0.05+0.10+0.15)=5.0 which is a perfect score for this RTP factor.

Resources (R)—20%

An example computation is: 20%×[Funding (0.60)+Owner Previously (0.20)+Lawyer (0.20)]

An example computation for Funding parameter is: 0.60×(1.0 for Financing: cash available OR (1.0 for Mortgage preapproval)

An example computation for Owned Previously parameter is: 0.30×(1.0 for Yes, 0.70 for No)

An example computation for Lawyer parameter is: 0.20×(1.0 for Yes, 0.30 for No)

Purchase Criteria—10%

An example computation is: 10%×[0.80×Home Checklist×(0.70 for 1-3 fields completed, 1.0 for 4+ fields completed)+[0.20×Geography (1.0 for address, 0.95 for street, 0.94 for neighborhood)]

Motivation (M)=8.9%

An example computation is: 8.9%×(1.0 for any field completed×0 for blank)

Time Parameters (T)=15%

Buy and Close

An example computation for buy and close Now parameter is=1.0 3-6 months=0.95% 6-12 months=0.90% 12+ months=0.70%

Buy Now

An example computation for a buy now parameter is:
Close Now=0.20×(1.0×1.0)=0.20
Close 3-6 months=0.20×(1.0×0.95)=0.19
Buy Now/Close 6-12 months=0.20×(1.0×0.90)=0.18
Buy Now/Close 12+ months=0.20×(1.0×0.70)=0.14

Buy 3-6 Months

An example computation for a buy 3 to 6 months parameter is:
Close 3-6 months=0.20×(0.95×0.95)=0.18
Close 6-12 months=0.20×(0.95×0.90)=0.17
Close 12+=0.20×(0.95×0.70)=0.13

Buy 6-12 Months

An example computation for a buy 6 to 12 months parameter is:
Close 6-12 months=0.20×(0.90×0.90)=0.16
Close 12+=0.20 (0.90×0.70)=0.12

Buy 12+ Months

An example computation for a buy 12+ months parameter is:
Close 12+=0.20×(0.70×0.70)=0.10

Engagement (E)=11.1%

An example computation is: 0.111×[Post 1.0×(I %+R %+C %+T %+M %)]

Example of perfect engagement score 0.111[1.0×(0.05+0.20+0.10+0.20+0.089]/0.639=0.111

Disclosure (D)=25%

An example computation is: 0.25×[(0.70×1.0 if posted a social media account in registration+0.20×1.0 completed community field in registration.+0.10×1.0 if completed I'm moving because I want to . . . field in registration)] Note: a value of zero is applied within this equation if user does not include the field within registration.

Purchaser Registration

The following provides an example overview of purchaser registration to generate a profile 108 (FIG. 1). This registration may be implemented at 302 of FIG. 3, for example.

Basic Member registration and/or login information may include:
- Email (requirement: verify accuracy and/or a working email, with call to action to reenter)
- Username/First name (first name opt)
- Password (enter password, forgot password)
- Login with LinkedIn, Facebook etc. (opt)
- Registration Check: I accept the Terms of Service (easiest and fastest method for user to checkmark)/I am using the site for my own personal purposes/Please send me know about updates and new features.
- Top (preferred, elite) Purchaser Registration Fields may include: Profile photo, Timeframe to buy/close, Resources such as finances and resources, My Story, social media profiles, Are we connected field, Who I am field and search criteria. All of these fields may be viewable by the general public, but there may be secure/protected fields such as the connected field that are release to owner's with a registered address that matches to the geographic region a purchaser has posted.

The registration may include a profile photo with options from a picture gallery or prompt to upload photo from LinkedIn, Facebook, etc. In an embodiment, only owner members registered with an address that corresponds to the geographic region within a purchaser's post may access to social accounts.

The registration may include a My Story entry to indicate if the purchaser is looking to buy or rent a real estate asset. This may also indicate why the purchaser is moving (family, alone) and the reason for purchase interest (e.g. live close to work, trade-up in my neighborhood, live by family and friends, lifestyle change). In an embodiment, only owners registered with an address that corresponds to geographic region within a purchaser's post may have access to the social accounts.

The registration may include a connection field indicating if the purchaser belongs to one or more groups (e.g. work, volunteer, activity, community). Note only owner members registered with an address that corresponds to the geographic region within a purchaser's post may access these fields. Within purchaser registration, users need examples and/or prompt questions that are uploaded within this text. Example community connections:
- Work: (purchaser manually completes this field)
- Volunteer group: (purchaser manually completes this field)
- Activity (purchaser manually completes this field)
- Social Media profiles
- College/University, Fraternity, Sorority The registration may include a classification field, including contractor or real estate developer ready to renovate or build new, owner who has previously owned a home, buying my first home, and so on.

The registration may include resources and timeframe fields, including: resources available (mortgage preapproved for the approximate appraised value, financing for the approximate appraised value), lawyer, time frame (a) Buy: i) Now ii) 3-6 months iii) Next year, b) Close or Move in i) Now ii) 3-6 months iii) Next Year).

The registration may include a Home Criteria field, including must haves and nice options:
- desired type (detached home, condo, apartment, townhouse, hobby farm, agricultural, land, personal or Commercial),
- Bedrooms: 5, 4, 3, 2, 1
- Master Bathroom
- Master Closet
- Number of Bathroom: 5+, 4, 3, 2, 1
- Home Office
- Mudroom with Separate Entrance
- Main floor or Upper Level Laundry
- Great room
- Finished Basement: Partial, Full, Unfinished
- Renovated Level: Partial, Full or None
- Garage: Attached/Detached
- Driveway-Private, shared, none
- Exposure: Southeast, Southwest, Northeast, Northwest
- Swimming Pool
- Yard: Standard shape
- Street: Cul-de-sac, through street, crescent
- Position on street: End curb, between others
- Backyard Privacy: Complete, partial, none
- Backyard Fencing: Fully fenced, Partial, none
- Other: (manual entry)

The registration may include message preferences (e.g. I'm interested in receiving messages from owners 10 km from my posted location).

The registration may include payment preferences and promotions.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

Figure 12:
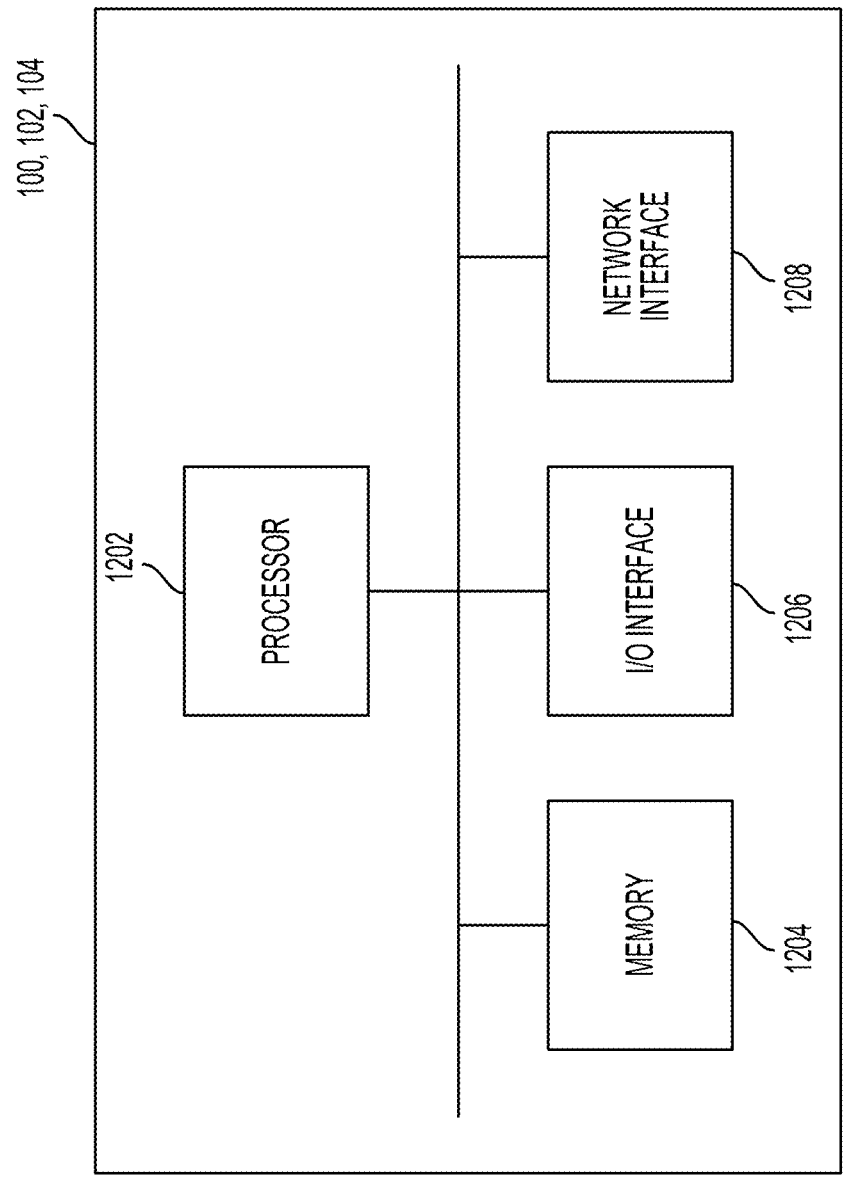
FIG. 12 shows an example computing device.

FIG. 12 shows an example computing device that may represent platform 100, purchaser device 102, or owner device 104.

As depicted, computing device 100, 102, 104 includes at least one processor 1202, memory 1204, at least one I/O interface 1206, and at least one network interface 1208.

Each processor 1202 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1204 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1206 enables computing device 100, 102, 104 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WMAX), SS7 signaling network, fixed line, local area network, wide area network, and others, including any combination of these.

Computing device 100, 102, 104 is operable to register and authenticate users (using a login, unique identifier, and password for example) prior to providing access to applications, a local network, network resources, other networks and network security devices. Computing devices 4 may serve one user or multiple users.

These are illustrative embodiments. As noted, real estate transactions are example transactions and there may be different transactions for properties, products and services.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

What is claimed is:

1. A platform for generating an interface with a visual representation of a geographic region for a corresponding geographic location of interest, the platform having a data storage device storing electronic indications in profiles for purchasers and a processor configured to generate data indicating purchase interest in assets from purchasers by accessing the electronic indications stored in the data storage device, generate a RTP score for each of the potential purchasers using weighted RTP factors derived from a profile for the respective purchaser stored in the profiles for purchasers on the data storage device, and generate an interface for purchase demand of the assets based on the RTP scores of the purchasers, the interface having the visual representation of the geographic region for the corresponding geographic location of interest, the visual representation having visual elements indicating a number of assets within the geographic region and a location of each of the assets within the geographic region, wherein each visual element indicates a number of purchasers interested in a location within the geographic region and segments the purchasers into groupings based on different geographic indicators to provide an aggregated view of the purchasers, wherein the interface indicates the RTP score for each of the purchasers, wherein the processor is configured to monitor activity of purchaser devices at the interface to capture and store monitored activity as the electronic indications in the profiles for purchasers on the data storage device, wherein the processor generates the RTP scores with input from the monitor activity stored as the electronic indications by accessing the data storage device, wherein the processor is configured to continuously monitor activity of the purchaser devices at the interface to capture and store additional monitored activity as the electronic indications in the profiles for purchasers in the data storage device, wherein the processor generates updated RTP scores with input from the additional monitored activity stored as the electronic indications, and dynamically updating, at the interface, the one or more visual elements based on updated RTP scores.

2. The platform of claim 1 wherein the processor is configured to receive additional data indicating additional purchase interest in the one or more assets from one or more additional purchasers and dynamically update, at the interface, the one or more visual elements based on updated RTP scores from the additional data.

3. The platform of claim 1 wherein the RTP score is a numeric or graded value that is transformed to visually indicate the calculated readiness, ability or likelihood of a purchaser to complete a transaction for the one or more assets.

4. The platform of claim 1 wherein the RTP factors are weighted based on their significance to a readiness to purchase, wherein the processor refines the weight values using feedback and machine learning rules, the rules corresponding to different RTP factors and processed transactions.

5. The platform of claim 1 further comprising a matching address engine that correlates owner registered addresses to purchaser posted addresses to release owner message functionality and to access specific private purchaser fields.

6. The platform of claim 1 further comprising an inter-user message tool to allow an owner device and a purchaser device to exchange electronic messages, wherein the processor records electronic message data in message data storage.

7. The platform of claim 1 wherein the one or more assets comprise real estate assets.

8. The platform of claim 1 further comprising a network interface with third party services to receive input data relating to purchasers, owners, real estate assets, geographic locations; an aggregator that correlates the received input data for the RTP factors and information in the profiles of the purchasers, data received from aggregator, real estate properties, geographic data, historical data, behavioural data, and achievements, wherein the processor is configured to update, at the interface, the one or more visual elements based on updated RTP scores with the aggregated data.

9. The platform of claim 1 wherein the processor is configured to connect with an owner device, generating a request to find purchaser posts on a geographic region, processing the posting request and triggering a purchaser posting and a RTP score for each purchaser in the purchaser listing and rank the purchasers according to the RTP score.

10. The platform of claim 9 wherein the purchaser posting request has configurations or preferences for generating the RTP score, including a selection of RTP factors and a suggested weighting or other indicated importance of one or more of the RTP factors.

11. The platform of claim 9 wherein the processor determines that the owner device has not registered and provided a profile address identifier that corresponds to the geographic region, and renders the owner device unable to send electronic messages or gain access to purchaser private data.

12. The platform of claim 1 wherein the processor is configured to provide potential vendors of property with access to the interface and information regarding the number of potential purchasers of the one or more assets.

13. The platform of claim 1 wherein the processor is configured to provide potential vendors of the one or more assets with information regarding the RTP score for each potential purchaser, the information including the visual representation.

14. The platform of claim 1 wherein the processor is configured to provide market information to an owner of the one or more assets to make a determination of a sales process.

15. A process for generating an interface with a visual representation of a geographic region for a corresponding geographic location of interest for asset management comprising: monitoring activity of purchaser devices of one or more purchasers at the interface to capture and store monitored activity as electronic indications in profiles for purchasers on a data storage device, storing data indicating purchase interest in one or more assets from the one or more purchasers in the profiles for purchasers on the data storage device, generating a RTP score for each of the one or more purchasers using a processor that computes weighted RTP factors by reading data from a profile for the respective purchaser of the profiles for purchasers stored in the data storage device, generating an interface for purchase demand of the one or more assets, generating, at the interface, the visual representation of the geographic region for the corresponding geographic location of interest, the visual representation having visual elements indicating a number of assets within the geographic region and a location of each of the assets within the geographic region, wherein each visual element indicates a number purchasers interested a location within the geographic region, and segments the purchasers into groupings based on different geographic indicators to provide an aggregated view of the purchasers, indicating at the interface the RTP score for each of the one or more purchasers, displaying the visual representation on the interface at a computing device, continuously monitoring activity of the purchaser devices at the interface to capture and store additional monitored activity as the electronic indications in the profiles for purchasers in the data storage device, receiving additional data indicating additional purchase interest in the one or more assets from one or more additional purchasers, generating updated RTP scores with input from the additional monitor activity stored as the electronic indications, and dynamically updating at the interface, the one or more visual elements to indicate the updated RTP scores with the input from the additional monitor activity and the additional data.

16. The process of claim 15 further comprising weighting the RTP factors based on their significance to a readiness to purchase, refining the weight values using feedback and machine learning rules, the rules corresponding to different RTP factors and processed transactions.

17. The process of claim 15 further comprising correlating owner registered addresses to purchaser posted addresses to release owner message functionality and to access specific private purchaser fields.

18. The process of claim 15 further comprising receiving, at a network interface with third party services, input data relating to purchasers, owners, real estate assets, geographic locations; correlating the received input data with the RTP factors and information in the profiles of the purchasers, real estate properties, geographic data, historical data, behavioural data, and achievements, and continuously updating, at the interface, the one or more visual elements based on updated RTP scores with the aggregated data.

19. The process of claim 15 wherein the one or more assets comprise real estate assets.

* * * * *